INVENTOR.
EDWARD H. SOMMERFIELD

BY Leo J. Aubel
ATTORNEY

United States Patent Office 3,289,008
Patented Nov. 29, 1966

3,289,008

FLOATING NONSATURATING SWITCH

Edward H. Sommerfield, Endicott, N.Y., assignor to International Business Machines Corporation, New York, N.Y., a corporation of New York Filed Apr. 1, 1963, Ser. No. 269,370
8 Claims. (Cl. 307—88.5)

This invention relates to voltage switches and more patricularly to a floating nonsaturating transistor voltage switch.

It has been found to be desirable in various applications to utilize a transformer-driven floating nonsaturating voltage switch; that is, a switch whose emitter voltage reference is not defined by a fixed potential and a low impedance or, in other words, a voltage switch not tied to a fixed potential.

In such voltage switch circuits, it has also been found to be desirable to minimize the recovery time of the driving transformer. Heretofore, for example, in driving core arrays by a current source, voltage switches and diode steering circuits, it has been found that if the voltage switches are referenced electrically at a selected emitter voltage which may vary, a problem has been to turn the voltage switch ON and OFF in a minimum amount of time using low driving power. Also, it has been found desirable in a transistor switch to isolate the driving function of a switch from the switching function of a switch; that is, to isolate the base to emitter function from the emitter to collector function to prevent interaction which could retard the switching function.

It is a principal object of the present invention to provide an improved voltage switching circuit which has a floating reference.

It is another object of the present invention to provide a voltage switching circuit which can be coupled electrically anywhere in the circuit and which is independent of any fixed emitter voltage reference.

It is another object of the present invention to provide a circuit which isolates the driving function from the switching function.

It is another object of the present invention to provide a voltage switch having a fast recovery time.

It is still another object of the present invention to provide a transistor circuit in which the switching function recovers in a minimum amount of time because the transistor is prevented from being saturated and in which the drive function also recovers fast due to improved circuitry configuration.

It is another object of the present invention to provide a voltage switch which can be coupled in logical circuitry.

It is known in the prior art to provide a nonsaturating type of transistor switch by providing a fixed emitter reference, a resistor having a high impedance connected to the base, and applying a fixed turn ON signal through this resistor to the base; the base current is generated directly in the signal input path. In this prior art circuit, to prevent saturation of the transistor, a portion of the input current is subtracted by action of a collector feedback diode which results in a reduction of base current. Circuits of this type must be coupled to a fixed emitter reference. Further, circuits of this type cannot be conveniently connected in series and used as logical circuits because of the fact that the voltage sources must be maintained at specified established levels.

In the attainment of the foregoing objects, I provide a floating nonsaturating driver in which the anti-saturation reference varies in accordance with the varying emitter voltage reference. In particular, in one embodiment, the secondary winding of an input transformer has one terminal connected to the base of a transistor and the other terminal of the secondary winding is connected to the emitter. A feedback winding on the input transformer has one terminal connected to the emitter and the other terminal connected through a diode to the collector of the transistor; the diode is normally reverse biased until the load current reaches the equilibrium value. It then, in effect, connects the feedback winding in the circuit to allow it to function as a voltage generator to thereby prevent the transistor from saturating. The primary winding of the input transformer includes circuitry for providing a fast recovery time.

This invention thus provides a nonsaturating, nonreferenced voltage switch having a fast recovery time and which is designed to operate with pulses of high repetition rates; and, the switch can operate with loads which may have large variations in current. The circuit of the invention may be used to equal advantage in logical circuits or as a core array switch.

The foregoing and other objects, features and advantages of the invention will be apparent from the following more particular description of preferred embodiments of the invention, as illustrated in the accompanying drawings.

Figure 1:
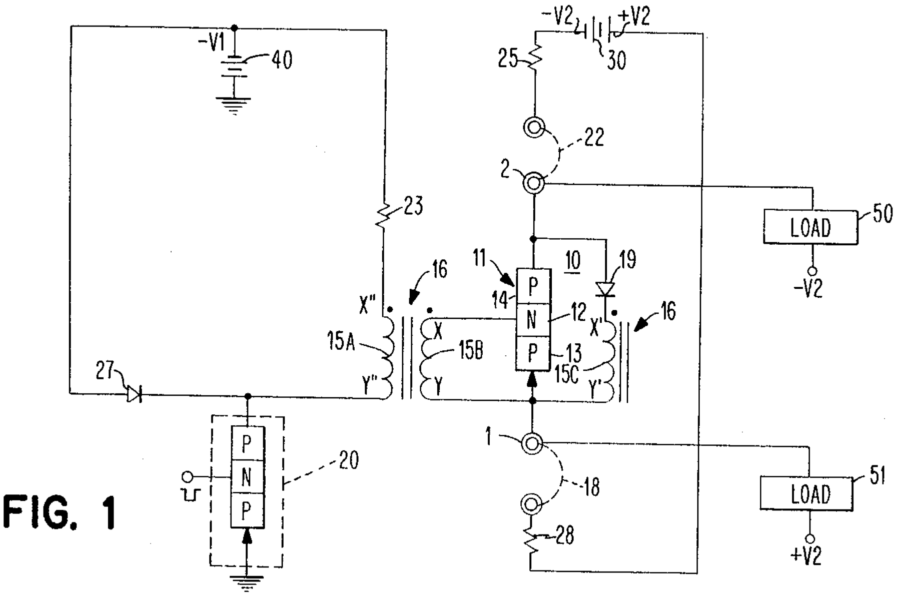
FIG. 1 is a schematic drawing of a floating nonsaturating switch in accordance with the invention.
Figure 2:
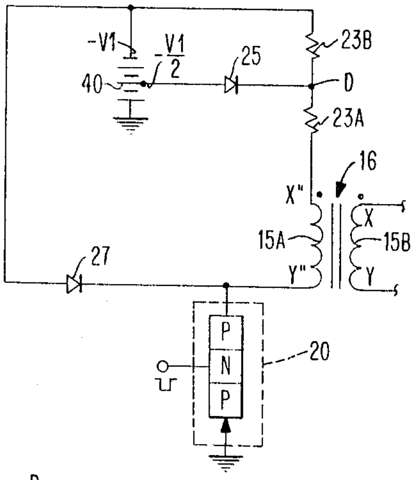
FIG. 2 is a schematic drawing of a modification of the circuitry of the primary winding of the transformer of FIG. 1 to reduce the switch recovery time.
Figure 2A:
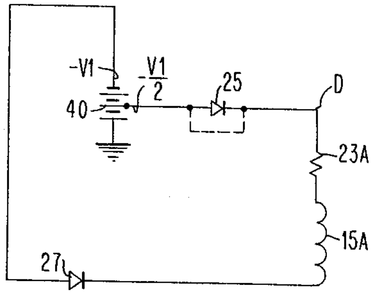
Figures 3, 4:
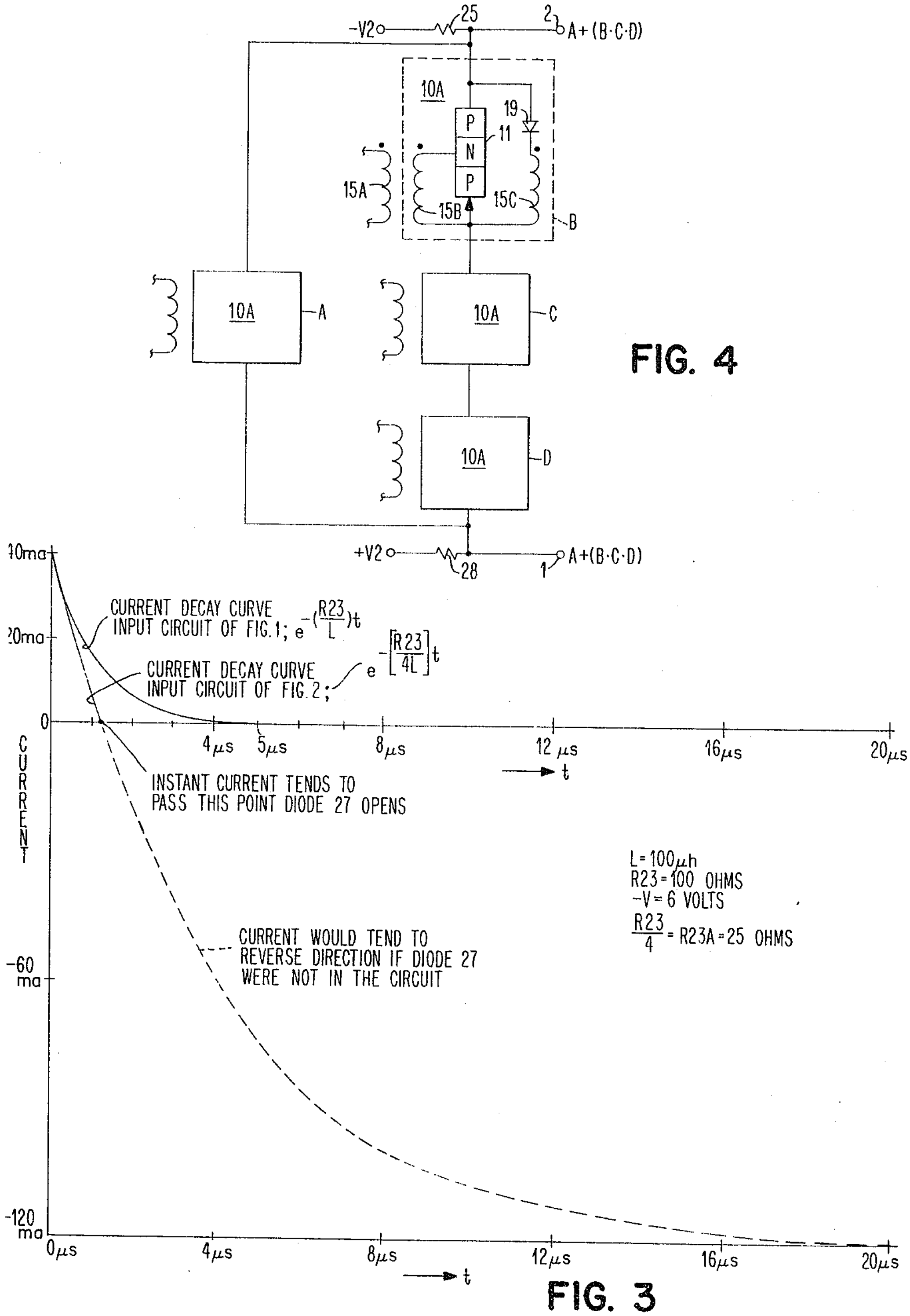

FIG. 2*a* is a schematic drawing of a selected current path useful in explaining the operation of FIG. 2;

FIG. 3 is a graph useful in explaining the operation of the circuit of FIG. 2; and FIG. 4 is a block diagram showing the circuitry 10 of FIG. 1 connected in a particular logical configuration.

One embodiment of the floating nonsaturating switch circuit 10 in accordance with the invention is shown in FIG. 1. FIG. 1 shows a transistor 11 having a base 12, an emitter 13 and a collector 14. The base 12 is connected to terminal X of a secondary winding 15B of a transformer 16. The other terminal Y of the secondary winding 15B is connected to the emitter 13. The emitter 13 is also connected to an output terminal 1. The terminal 1 may connect through an electrical jumper 18 and a resistor 27 to a positive source of potential +V2, which may be obtained from the positive terminal of a source such as a battery 30. The collector 14 is connected to the anode of a diode 19; the cathode of diode 19 is connected to terminal X′ of a second secondary winding or feedback winding 15C of transformer 16. The other terminal Y′ of winding 15C is connected to the emitter 13. The collector 14 is also connected to a second output terminal 2. The terminal 2 connects through an electrical jumper 22 and a resistor 25 to a negative potential −V2 of battery 30.

The terminals X and X′ of secondary windings 15B and 15C are wound to have the same instantaneous polarites; this is indicated by the conventional dot representation. There is a step-up in turns ratio from the winding 15B to the winding 15C; in one embodiment, this step-up ratio is 1 to 2.

The jumpers 18 and 22 are shown in the drawing to more clearly point out a principal portion of the switch 10. As indicated in FIG. 1, one, or the other, or both of resistors 25 and 28 may be connected to the floating switch 10; likewise, one, or the other, or both of the potentials −V2 and +V2 may be connected to the floating switch 10. Note, that one or the other of the resistors 25 or 28 is needed in order to limit the circuit current. An output signal may be obtained from either terminals 1 or 2, or from both terminals concurrently; that is, a load may be connected to either terminal 1 or 2, or to both terminals concurrently. As shown in FIG. 1, a first load 50 may have one terminal connected to potential —V2 and its other terminal connected to switch terminal 2; a second load 51 may have one terminal connected to potential +V2 and its other terminal connected to switch terminal 1. The loads 50 and 51 need not be connected specifically to —V2 and +V2 potentials respectively; the only criteria for the voltage reference to which the loads 50 and 51 are connected is that the equivalent return voltage of the collector 14 be negative with respect to the equivalent return voltage of the emitter 13 when the transistor 11 is turned OFF; that is, the voltage appearing at the collector 14 is negative relative to the emitter 13 when the transistor 11 is turned OFF. (Of course, this polarity condition would be reversed if NPN type transistors are used.)

The terminal X'' of the primary winding 15A of transformer 16 is connected through a resistor 23 to a potential —V1, which may be obtained from a source such as a battery 40. The other terminal Y'' of primary winding 15A is connected through an electronic pulse control switch 20, of any suitable known type, to ground reference. A diode 27 has its cathode connected to terminal Y'' of winding 15A and its anode connected to the potential —V1. Terminal X'' of winding 15A is arranged to have the same instantaneous polarity as terminals X and X' of secondary windings 15B and 15C, as indicated by the conventional dot representation.

The operation of the circuit is as follows:

Assume the pulse control switch 20 is open (non-conducting) and circuit 10 is initially in a quiescent state; that is, that the transistor 11 is in a nonconducting condition, that the diode 19 is reverse biased by the potentials —V2 and +V2 and that no current flows in the primary winding 15A of transformer 16. The transistor 11 is nonconducting since the base 12-to-emitter 13 junction of transistor 11 is essentially short-circuited by secondary winding 15B.

Assume that the pulse control switch 20 is closed, as by a signal pulse indicated in FIG. 1. Upon closure of pulse control switch 20, a current $i1$ will flow from ground through switch 20, winding 15A, resistor 23, the potential —V1 terminal and battery 40 back to ground. Due to the relative magnitudes of resistor 23 and potential —V1, the current $i1$ will be an essentially constant current. This will cause an essentially constant magnetic field of magnitude $N1i1$ to be developed in transformer 16. As is conventional, the N1 is the number of turns on winding 15A, N2 is the number of turns on winding 15B, and N3 is the number of turns on winding 15C. The magnetic field $N1i1$ causes a voltage $v2$ to be developed across terminals X and Y of winding 15B of transformer 16; the voltage $v2$ is of such a polarity and magnitude as to forward bias the base 12-to-emitter 13 junction of transistor 11. The voltage $v2$ across winding 15B is a constant voltage because of the diode effect of the emitter 13-to-base 12 junction; further because of transformer action, the voltages $v1$ and $v3$ across windings 15A and 15C are constant. Neglecting transformer losses, and if diode 19 is reverse biased, a base current $ib$ will flow in transistor 11; the current $ib$ is the same current $i2$ flowing in the secondary winding 15B (the terms $ib$ and $i2$ are herein used interchangeably). The current $ib$ will flow in the circuit loop which may be traced from terminal Y of winding 15B through the emitter 13-to-base 12 junction of transistor 11, through terminal X and winding 15B back to terminal Y. The current $ib$ flowing in the circuit just traced will be determined by the relationship that $N2i2=N1i1$. (In this embodiment, $N1:N2:N3=1:1:2$.)

At the time that the voltage $v2$ is developed in winding 15B, a voltage $v3$ is developed across winding 15C; $v3=v2\times N3/N2$. Initially, no current will be flowing through the winding 15C due to the fact that the diode 19 is reverse biased by having its anode connected through resistor 25 to the negative potential —V2 and its cathode connected through winding 15C and resistor 28 to the positive potential +V2. The voltage $v3$ developed across winding 15C, although it is of the proper polarity, is not in itself of sufficient magnitude to overcome the reverse bias of diode 19.

An emitter 13-to-collector 14 current $ic$ will be initiated by the base current $ib$ flowing in the emitter 13-to-base 12 circuit previously traced. A portion of the collector current $ic$, namely, a load current $iL$ will flow through a path which may be traced from the positive potential +V2 through the resistor 28, jumper 18, output terminal 1, emitter 13-to-collector 14, terminal 2 and the resistor 25 to the negative potential —V2. The collector current $ic$=load current $iL$+the feedack current $i3$ flowing through winding 15C, as will be discussed hereinbelow. The magnitude of the current $iL$ increases until the voltage $vce$ developed across the collector 14-to-emitter 13 terminals combined with the voltage $v3$ developed across terminals X' and Y' of winding 15C forward biases diode 19. The equilibrium point of the circuit is arranged such that diode 19 becomes forward biased and conducts, in this case, 17 ma. of current when the load current $iL$ is 250 ma., as explained hereinbelow. When diode 19 becomes forward biased, the feedback current $i3$ will be caused to flow through the circuit path which may be traced from terminal Y' of winding 15C through the emitter 13-to-collector 14 terminals of transistor 11, through diode 19, terminal X' and winding 15C back to terminal Y'.

The magnetic fields developed by the currents flowing in windings 15B and 15C are of a polarity such as to subtract from constant field developed by $N1i1$ in winding 15A. Since, in this embodiment, the turns ratio of the windings 15A, 15B and 15C is given by $N1:N2:N3=1:1:2$, and if the magnitude of the current flowing in the winding 15A is 40 ma., then the magnitude of the currents flowing in windings 15B and 15C are approximately 5 ma. and 17½ ma., respectively. In this embodiment, the current magnitudes were: base current $-ib=i2=5.34$ ma.; the feedback current through winding 15C $-i3=17.33$; and, the collector current $$-ic=iL+i3=267.33$$

As stated above, the collector current $i$ is the total of $c$ load current $iL$ and the feedback current $i3$ through winding 15C.

When diode 19 is reverse biased, the current $i1$ in winding 15A is approximately 40 ma. and the current $ib$ or $i2$ in winding 15B is approximately 40 ma.; but when the diode 19 becomes forward biased, the current $ib$ in winding 15B falls to about 5 ma. and the current in winding 15C becomes about 17½ ma., since $$N1i1=N2i2+N3i3=(1\times 5\text{ ma.})+(2\times 17.5\text{ ma.})=40\text{ ma.}$$

Digressing for a moment, note that a base current $ib$ of 40 ma. was applied to transistor 11 prior to the time diode 19 became forward biased. Subsequently, when diode 19 became forward biased, this base current $ib$ was reduced to about 5 ma. This, therefore, provides a large amount of initial overdrive base current $ib$ for turning transistor 11 ON with subsequent lowering of the base current $ib$ to a stable level during the remainder of the pulse period. In the transistor 11 of this embodiment, the maximum load current $iL$ which can flow is 250 ma. A base current $ib$ of about 5 ma. (specifically 5.15 ma.) is sufficient to maintain the collector current $ic$ $$(ic=iL+i3)$$

flowing once the transistor 11 is turned ON, assuming an amplification factor A of 50 for a common emitter connection. Thus, when transistor 11 is initially turned ON and a base current $ib$ of 40 ma. is flowing, there is about an 800% overdrive base current $ib$ which causes transistor 11 to turn ON very rapidly.

If the load current $i_L$ should tend to increase above 250 ma., the voltage $v_{ce}$ will try to decrease. This will cause diode 19 to conduct more heavily. This increased current flowing through winding 15C will cause a further subtraction of the magnetic field $N_3i_3$ from the magnetic field $N_1i_1$, which in turn will decrease the base current $i_b$ resulting in the flow of less collector current $i_c$ and in turn less load current $i_L$ until the voltage $v_{ce}$ returns to its equilibrium potential.

If the load current $i_L$ tends to become smaller than the permitted value of, in this embodiment, 250 ma. the voltage $v_{ce}$ will increase above the potential of $v_3$ and the diode 19 will become reverse biased. Then the current $i_3$ will no longer flow through winding 15C and thus the magnetic field $N_3i_3$ will no longer subtract from the magnetic field $N_1i_1$. This, in turn, will cause more base current $i_b$ to flow and in turn more collector current $i_c$ to flow and thus more load current $i_L$ to flow, which will cause the collector 14-to-emitter 13 terminal voltage $v_{ce}$ to return to the equilibrium state.

Thus, the voltage $v_{ce}$ developed at equilibrium across the collector 14-to-emitter 13 terminals is of such a magnitude as to keep transistor 11 out of the saturated region. This voltage is determined by the base 12-to-emitter 13 voltage $v_{be}$ which is transformed by the ratio of $N_3$ to $N_2$ (assuming diode 19 is a perfect unilateral conducting device). Since diode 19 is normally not a perfect unilateral conducting device, the voltage will be slightly lower than the theoretical turns ratio by the voltage drop developed across diode 19.

As is known, the magnetizing inductance of transformer 16 is an energy storing medium. Upon opening of the pulse control switch 20, the voltage developed across windings 15A, 15B and 15C will instantaneously reverse polarities due to stored inductive energy. When this occurs, diode 19 will almost imediately become reverse biased. Also, since after turn ON transistor 11 is being driven by a relatively low emitter 12-to-base 11 current $i_b$ of about 5 ma., the stored charge in the base 12 region of transistor 11 is of sufficiently low magnitude so that it can be quickly removed by the inductive energy stored in winding 15B.

A significant advantage of the circuit in accordance with my invention is the fact that the circuit is floating; that is, that its operation does not depend on a fixed emitter reference voltage; in fact, the circuit can operate in a nonsaturated mode even though its emitter reference voltage varies as a function of time. The fact that the transistor in the circuit of my invention is floating, permits output loads to be connected either to the collector of the transistor or to the emitter of the transistor or to both electrodes concurrently.

The floating nonsaturating transistor switch 10 is of general usage. Further, the switch 10 may be conveniently used in logical circuits by connecting a plurality of these circuits 10A in parallel or in series. The drawings of FIG. 4 show a logical circuit in which a plurality of the switches 10 are connected in parallel and in series. Note that in FIG. 4, each of the circuits labeled 10A will include the transistor 11, secondary windings 15B and 15C of transformer 16, and diode 19 of the circuit 10 of FIG. 1. (Like reference characters in FIGS. 1 and 4 refer to like elements.) The resistors 25 and 28 are connected between the voltage potential $-V_2$ and $+V_2$ and the top and lower circuits 10A, respectively. Each distinct logical input signal is coupled to each circuit 10A. The output signals could be obtained from the terminal 2 in the uppermost circuit or from terminal 1 of the lowermost circuit. As an example, in FIG. 4, the circuits 10A are connected to provide the logical function $A+(B\cdot C\cdot D)$; the factor provided by each circuit 10A is indicated by the labeling or notation on each rectangle of FIG. 4.

In order to initiate a faster recovery of transformer 16 between pulses, the input circuit of FIG. 1, that is, the circuitry connected to primary winding 15A of transformer 16, was modified as shown in FIG. 2. Like reference characters in FIG. 2 refer to like elements in FIG. 1. In the circuit of FIG. 2, the primary winding 15A has terminal X″ connected in series through resistors 23B and 23A to a negative potential $-V_1$ of battery 40. Note that in the circuit of FIG. 2, the resistor 23 has been modified to consist of two resistors 23A and 23B. The resistance of the resistors, in this embodiment, is: $R23=$ 100 ohms; $R23A=25$ ohms and $R23B=75$ ohms. As is known, a single resistor having a tap connection may be used instead of two separate resistors. The junction D of resistors 23A and 23B is connected to the cathode of a diode 25; the anode of diode 25 is connected to a potential which is of less magnitude than the potential $-V_1$ of battery 40; this lesser potential may be a selected tap on the battery 40 and, in this embodiment, it is equal to $-V1/2$. As in FIG. 1, the other terminal Y″ of winding 15A is connected through the pulse control switch 20 to ground reference. The terminal Y″ of winding 15A is also connected to the cathode of a diode 27; the anode of diode 27 is connected to the potential $-V_1$ of battery 40.

The operation of the input circuit of FIG. 2 is as follows:

Initially, that is, before the switch 20 is closed, a steady current which will be termed $i_q$ will be flowing from the potential $-V1/2$ tap on battery 40, through diode 25 and resistor 23B to the $-V_1$ potential terminal of battery 40 and back through the battery 40 to the $-V1/2$ potential tap; this current $i_q$ causes junction point D to be clamped to a voltage at about the $-V1/2$ potential (the voltage drop across diode 25 will be neglected for explanation purposes).

During the turn ON time, when pulse control switch 20 is closed, upon the initiation of a flow of current $i_1$ through resistors 23A and 23B, the potential of junction D will go more positive (less negative) to such a magnitude as to reverse bias diode 25 and the potential $-V1/2$ will be effectively disconnected from the circuit of primary winding 15A. Thus, during the turn ON period, resistors 23A and 23B will act in the same manner as the single resistor 23 does in the circuit of FIG. 1.

The circuit of FIG. 2 will also operate similarly to the circuit of FIG. 1 during the stable ON portion of the pulse period during which the pulse control switch 20 is closed. During the time pulse control switch 20 is closed, a current $i_1$ will be flowing through a winding 15A; the current path will be from ground, switch 20, winding 15A, resistors 23A and 23B, through battery 40 from the potential $-V_1$ terminal to ground. The polarity of the voltage $v_1$ developed across winding 15A will be positive at terminal Y″ and negative at terminal X″.

The theory of operation of the circuit of FIG. 2 during the turn OFF time, that is, at the time pulse control switch 20 is opened, is believed to be as follows:

At the instant of turn OFF, and as is known, the voltage $v_1$ developed across winding 15A will change instantaneously such that its polarity is positive at terminal X″ and negative at terminal Y″. This voltage $v_1$ will tend to keep the current $i_1$ flowing in the same direction it has been flowing; the current path for current $i_1$ may be traced from the upper terminal X″ of winding 15A through resistors 23A and 23B, the diode 27, the lower terminal Y″ of winding 15A and through winding 15A back to its upper terminal X″. As this current $i_1$ decays to a value which provides a voltage which is more negative than $-V1/2$ volts at junction point D, diode 25 will become forward biased. Since current $i_1$ continues to decay, junction point D can be considered to remain at $-V1/2$ (assuming diode 25 is a perfect diode). It is well known that current (other than leakage current) does not pass through a diode in the reverse direction. However, to clarify the explanation of this circuit operation if it is assumed that diode 25 is kept in the forward biased condition, point D will be considered as directly connected to $-V1/2$ during the remainder of the decay period.

Based upon this assumption, the net effect current path can be traced from terminal X'' through resistor 23A, point D, the intermediate potential $-V1/2$ terminal, battery 40, the $-V1$ potential terminal, diode 27, and terminal Y'' of winding 15A back to terminal X''. The equation that describes this relationship is $$i1(t)=\left(\frac{\frac{-V1}{2}}{R23A}\right)+\left(i1+\frac{\frac{V1}{2}}{R23A}\right)e^{-\left(\frac{R23A}{L}t\right)}$$

where $i1(t)$ is the decay current through winding 15A and diode 27;

$t$ is the time factor;

$e$ is the known coefficient 2.2718 and the other terms are as described above.

At some time, current $i1(t)$ will equal zero amperes. At this time $t$, diode 27 will open circuit since there is no other voltage component to keep it forward biased as there is for diode 25.

Note that in the foregoing equation for $i1(t)$ that the current is tending towards a negative value as time $t$ increases (that is, a current in the opposite direction to $i1$); but this current $i1(t)$ is cut OFF at zero amplitude. This circuit results in a current decay period in which the current in winding 15A reaches a zero level at a time much shorter than does the current in the circuit of FIG. 1. The comparison is shown in FIG. 3 in which the current is indicated on the axis of ordinates and time $(t)$, is indicated along the axis of abscissa. The curves are labeled to indicate the circuit time constants of FIGS. 1 and 2.

The transistor 11 shown in this embodiment of the invention is of the PNP type; NPN type transistors could likewise be employed by providing proper biasing potentials and arranging the polarities of the windings and the loads as is well known in the art.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A nonsaturating switching circuit comprising a transistor amplifier including base, emitter and collector electrodes and means supplying an operating potential therefor;

a transformer including a primary winding, one secondary winding connected across the base-emitter electrodes, an additional secondary winding with a predetermined greater number of turns than the one secondary winding;

means selectively energizing the primary winding so as to induce into the one secondary winding an initial overdive base current for rapidly turning on the transistor which results in the consequent lowering of the emitter-collector potential drop; and a series circuit including a diode and the additional secondary winding connected across the emitter-collector electrodes and responsive to a predetermined low collector-emitter voltage drop for forward biasing the diode to initiate current flow in the latter secondary winding to thereby reduce the base current to a desired low value and prevent operation of the transistor in saturation.

2. A switching circuit comprising, in combination:

(a) a current control device having at least first, second and third electrodes;

(b) a transformer having first and second secondary windings;

(c) said first secondary winding being connected between said first and second electrodes;

(d) a unilateral conductive device;

(e) said unilateral conductive device and said second secondary winding being connected from said third to said second electrodes to provide a feedback circuit;

(f) said first secondary winding being pulsably energizable by a first magnetic field for causing said current control device to become conductive;

(g) the current flowing through said current control device increasing to a magnitude at which the voltage across said third to second electrodes biases said unilateral conductive device to cause a current to flow through said secondary winding; and, (h) the current flowing in said second secondary winding developing a magnetic field which effectively subtracts from said first magnetic field to thereby oppose additional current flow through said current control device whereby the magnitude of the current through said current contol device is maintained at a selected level.

3. A nonsaturating switching circuit comprising in combination:

(a) a transistor having a base, emitter and collector;

(b) a transformer having first and second secondary windings;

(c) said first secondary winding being connected from said base to said emitter and pulsably energizable by a first magnetic field for causing said transistor to become conductive;

(d) a unilateral conducting device;

(e) a feedback circuit comprising said device and said second secondary winding connected in series from said collector to said emitter, said device being connected to have a circuit polarity opposite to said emitter to collector polarity;

(f) the current flowing through said transistor increasing to a magnitude at which the voltage across said emitter to said collector forward biases said device and a current is permitted to flow through said second secondary winding; and (g) the current flowing in said second secondary winding developing a magnetic field which effectively subtracts from said first magnetic field to thereby reduce the base-emitter current flowing through said transistor and maintain the magnitude of the current flowing in said transistor from said emitter to said collector at a selected level.

4. A nonsaturating switching circuit comprising a transistor amplifier including base, emitter and collector electrodes and means supplying an operating potential therefor;

a transformer including a primary winding, one secondary winding connected across the base-emitter electrodes, and an additional secondary winding with a predetermined greater number of turns than the one secondary winding;

a diode connecting the additional secondary winding across the emitter-collector electrodes and poled for reverse biasing by the operating potential and for forward biasing by the additional secondary winding, said diode entering in its low impedance state when the additional winding voltage exceeds the emitter-collector potential; and means selectively energizing the primary winding to energize the one secondary winding so as to produce therein an initial overdrive base current and a subsequent desired low value base current incident to the conductivity of the additional secondary winding when the diode enters its low impedance state.

5. A floating nonsaturating voltage switch comprising, in combination:

(a) a transistor having base, emitter and collector electrodes and a source of operating potential therefor;

(b) a transformer having a primary winding, and first and second secondary windings;
(c) said first secondary winding being connected across the base electrode to the emitter electrode of said transistor;
(d) a diode having cathode and anode electrodes;
(e) said diode and said second secondary windings being connected in series from said emitter electrode to said collector electrode, said diode being connected to have its electrodes in relative opposite polarity to said emitter to collector electrode polarity, and said diode being reverse biased by said operating potential;
(f) said primary winding being pulsably energizable to develop an essentially constant magnetic field during a pulse period;
(g) said primary winding energizing said first secondary winding to cause a current to flow in the emitter electrode to base electrode circuit of said transistor and hence to cause a current to flow in the emitter electrode to collector electrode circuit of said transistor;
(h) said emitter electrode to collector electrode current increasing to a magnitude at which the voltage appearing across said emitter to said collector electrodes forward biases said diode, said diode when forward biased permitting a current to flow through said second secondary winding to develop a magnetic field to effectively subtract from said constant field and prevent a further increase in the magnitude of said current flowing in said emitter electrode to collector electrode circuit of said transistor; and,
(i) means for connecting a load to said transistor whereby an output current may be provided to the load from at least one of the emitter, collector electrodes.

6. A floating nonsaturating switch comprising, in combination:
(a) a normally conductive transistor having a base, emitter and collector;
(b) a transformer having a primary winding, and first and second secondary windings;
(c) said first secondary winding being connected from said base to said emitter;
(d) a diode;
(e) means for connecting said diode and said second secondary winding in series from said collector to said emitter, said diode being connected in relatively opposed polarity with respect to said emitter to collector polarity;
(f) a source of potential;
(g) an impedance element connected in series with said primary winding to said source;
(h) means for pulsing said primary winding;
(i) said source of potential and said impedance element each being of a magnitude to provide a constant current flow through said primary winding when said primary winding is pulsed to thereby provide a first magnetic field having a constant magnetizing force during the pulse period;
(j) said primary winding inducing energization of said secondary windings;
(k) said first secondary winding, when energized, causing said transistor to conduct;
(l) the magnitude of the current flowing through said transistor increasing to a point where said diode is forward biased and a current is permitted to flow through said second secondary winding; and
(m) said current flowing in said second secondary winding developing a magnetic field which subtracts from said first magnetic field to thereby oppose further increase in current flowing through said transistor, whereby the transistor is maintained below its saturation level.

7. A circuit as in claim 6 in which said impedance element comprises:
(a) first and second resistors connected in series to one another, said first resistor being connected to one terminal of said primary winding, and said second resistor being connected to a first terminal of said source of potential, the other terminal of said source of potential being connected to a fixed reference; and in which said pulsing means comprises,
(b) second and third diodes;
(c) said second diode having one terminal connected to the junction of said resistors, the other terminal of said second diode being connected to an intermediate potential point of said source;
(d) said primary winding having its other terminal connected through said third diode to said first terminal of said source, said third diode being normally reverse biased;
(e) switching means connecting said other terminal of said primary winding to said fixed reference;
(f) whereby when a pulse terminates the current in said primary winding decays rapidly to zero.

8. An input circuit for a transformer coupled circuit comprising, in combination:
(a) a source of potential;
(b) a primary winding of a transformer;
(c) first and second resistors connected in series to one another, said first resistor being connected to one terminal of said primary winding, said second resistor being connected to one terminal of said source of potential, the other terminal of said source of potential being connected to a fixed reference;
(d) second and third diodes;
(c) said second diode having one terminal connected to the junction of said resistors, the other terminal of said second diode being connected to an intermediate potential point on said source;
(f) said primary winding having its other terminal connected through said third diode to said first terminal of said source, said third diode being normally reverse biased;
(g) switching means connecting said other terminal of said primary winding to said fixed reference;
(h) whereby the current in said primary winding decays rapidly to zero when the switching means opens.

References Cited by the Examiner

UNITED STATES PATENTS

| | | | |
|---|---|---|---|
| 3,043,965 | 7/1962 | Scarbrough et al. | 330—28 X |
| 3,109,104 | 10/1963 | Mellott | 307—88.5 |
| 3,128,436 | 4/1964 | Anderson | 330—79 |

OTHER REFERENCES

Pressman: Design of Transistorized Circuits for Digital Computers, Rider Pub. Inc., March 1959, pp. 9–226 and 9–228 relied on.

References Cited by the Applicant

UNITED STATES PATENTS

| | | |
|---|---|---|
| 2,884,544 | 4/1959 | Warnock. |
| 2,915,740 | 1/1959 | Ricketts et al. |
| 3,034,107 | 5/1962 | Knowles. |

ARTHUR GAUSS, *Primary Examiner.*

D. D. FORRER, *Assistant Examiner.*